(12) United States Patent
Lesea et al.

(10) Patent No.: US 9,941,880 B1
(45) Date of Patent: Apr. 10, 2018

(54) SECURE VOLTAGE REGULATOR

(71) Applicant: Xilinx, Inc., San Jose, CA (US)

(72) Inventors: Austin H. Lesea, Los Gatos, CA (US); Stephen M. Trimberger, Incline Village, NV (US)

(73) Assignee: XILINX, INC., San Jose, CA (US)

( * ) Notice: Subject to any disclaimer, the term of this patent is extended or adjusted under 35 U.S.C. 154(b) by 0 days.

(21) Appl. No.: 15/353,530

(22) Filed: Nov. 16, 2016

(51) Int. Cl.
| *H03K 19/00* | (2006.01) |
| *H03K 19/003* | (2006.01) |
| *H01L 23/00* | (2006.01) |
| *H01L 23/525* | (2006.01) |
| *H03K 19/177* | (2006.01) |
| *G05F 1/46* | (2006.01) |
| *G06F 21/86* | (2013.01) |

(52) U.S. Cl.
CPC ............. *H03K 19/003* (2013.01); *G05F 1/46* (2013.01); *G06F 21/86* (2013.01); *H01L 23/5256* (2013.01); *H01L 23/576* (2013.01); *H03K 19/17744* (2013.01); *H03K 19/17768* (2013.01)

(58) Field of Classification Search
CPC ........... H03K 19/003; H03K 19/17744; H03K 19/17768; G05F 1/46; G06F 21/86; H01L 23/5256; H01L 23/576
See application file for complete search history.

(56) References Cited

U.S. PATENT DOCUMENTS

| 5,349,249 | A | 9/1994 | Chiang et al. |
| 6,020,633 | A | 2/2000 | Erickson |
| 6,118,869 | A | 9/2000 | Kelem et al. |
| 6,499,124 | B1 | 12/2002 | Jacobson |
| 6,748,368 | B1 | 6/2004 | Trimberger et al. |
| 6,864,142 | B1 | 3/2005 | Conn |
| 6,873,177 | B1 | 3/2005 | Wennekamp et al. |
| 6,894,527 | B1 | 5/2005 | Donlin et al. |
| 7,138,820 | B2 | 11/2006 | Goetting et al. |
| 7,180,776 | B1 | 2/2007 | Wennekamp et al. |
| 7,230,445 | B1 | 6/2007 | Goetting |
| 7,233,532 | B2 | 6/2007 | Vadi et al. |
| 7,235,999 | B2 | 6/2007 | Goetting et al. |
| 7,243,227 | B1 | 7/2007 | Knapp |
| 7,345,502 | B1 | 3/2008 | Lakkapragada et al. |
| 7,536,559 | B1 | 5/2009 | Jenkins, IV et al. |
| 7,599,299 | B2 | 10/2009 | Goetting et al. |
| 7,757,294 | B1 | 7/2010 | Simkins |
| 7,933,277 | B1 | 4/2011 | Schumacher et al. |
| 7,958,414 | B1 | 6/2011 | Ansari et al. |
| 8,074,077 | B1 | 12/2011 | Neema et al. |
| 8,355,502 | B1 | 1/2013 | Donlin et al. |
| 8,539,254 | B1 | 9/2013 | Bridgford et al. |

(Continued)

*Primary Examiner* — Alexander H Taningco
*Assistant Examiner* — Seokjin Kim
(74) *Attorney, Agent, or Firm* — LeRoy D. Maunu

(57) ABSTRACT

A system includes an integrated circuit (IC) chip with connections to plurality of external pins. An integrated voltage regulator circuit is configured to provide an internal supply voltage to the IC chip. Isolation circuitry is configured to inhibit tampering of the internal supply voltage through the external pins. An analog to digital converter (ADC) circuit is configured to monitor parameters of the internal supply voltage. Security circuitry is configured to detect, using the monitored parameters, indications of tampering and to generate an error signal in response to detecting an indication of tampering.

19 Claims, 6 Drawing Sheets

(56) References Cited

U.S. PATENT DOCUMENTS

| | | |
|---|---|---|
| 8,621,597 B1 | 12/2013 | Jenkins, IV |
| 8,713,327 B1 | 4/2014 | Peterson et al. |
| 8,981,810 B1 | 3/2015 | Trimberger et al. |
| 9,047,474 B1 | 6/2015 | Ahmad et al. |
| 9,304,174 B1 | 4/2016 | Taylor et al. |
| 2006/0192681 A1* | 8/2006 | Haider .................. G05F 1/465 340/661 |
| 2007/0182421 A1* | 8/2007 | Janke .................. G06F 21/558 324/522 |
| 2008/0061843 A1* | 3/2008 | Yanci ............. G06K 19/07735 327/78 |
| 2014/0035560 A1* | 2/2014 | Olmos ............. G01R 31/31719 324/76.41 |
| 2016/0239663 A1* | 8/2016 | Healy .................. G06F 21/554 |

* cited by examiner

SECURE VOLTAGE REGULATOR

TECHNICAL FIELD

The disclosure generally relates to voltage regulator circuits and devices, and more particularly to security associated with integrated voltage regulator circuits.

BACKGROUND

There are a variety of different applications that can use voltage regulation circuits including, but not limited to, programmable integrated circuits, programmable logic devices (PLDs), and System on Chip (SoC) devices. Some SoC devices can include programmable logic that is similar to programmable logic provided by various PLDs. PLDs are a type of programmable integrated circuit (IC) that can be programmed to perform specified logic functions. One type of PLD, the field programmable gate array (FPGA), can include an array of programmable tiles. These programmable tiles comprise various types of logic blocks, which can include, for example, input/output blocks (IOBs), configurable logic blocks (CLBs), dedicated random access memory blocks (BRAM), multipliers, digital signal processing blocks (DSPs), processors, clock managers, delay locked loops (DLLs), bus or network interfaces such as Peripheral Component Interconnect (PCI), PCI Express (PCIe) and Ethernet, and so forth. Some PLDs include enough components and functionality to effectively serve as an entire computer system on a single IC chip. Devices with such functionality are sometimes referred to as SoCs.

The power requirements of ICs, such as FPGAs and SoCs, can be difficult to meet as the size and speed of the devices increase. For example, a system designer who is using an FPGA in a design needs to satisfy the power requirements of the FPGA within the overall system. Satisfying power requirements of a system design can be complicated when the FPGA requires multiple different supply voltages for different purposes. Differences between the supply voltages may include recommended operating conditions, different amounts of current and other characteristics. Moving at least some of the regulation internal to the IC can be accomplished using integrated voltage regulator circuit, which provides an internal supply voltage to the IC. A side effect is a change to the potential threats relating to side-channel attacks that might compromise the security of the IC.

These and other problems can be problematic for ICs with one or more integrated voltage regulator circuits.

SUMMARY

A number of implementations are directed toward a system that includes an integrated circuit (IC) chip with connections to plurality of external pins; an integrated voltage regulator circuit that is configured to provide an internal supply voltage to the IC chip by regulating an external supply voltage received over the connections; isolation circuitry configured to inhibit tampering of the internal supply voltage through the external pins; an analog to digital converter (ADC) circuit that is configured to monitor parameters of the internal supply voltage; and security circuitry configured to detect, using the monitored parameters, indications of tampering and to generate an error signal in response to detecting an indication of tampering.

According to implementations of the present disclosure, a method is provided use with an integrated circuit (IC) chip. The method includes generating, using an integrated voltage regulator circuit within the IC chip, an internal supply voltage; monitoring, using an analog to digital converter (ADC) circuit of the IC chip, parameters of the internal supply voltage; detecting, using security circuitry of the IC chip and the monitored parameters, an indication of tampering; and generating an error signal in response to detecting the indication of tampering.

Various implementations of the present disclosure are directed toward a system with an integrated circuit (IC) chip that includes: programmable logic; a connections to plurality of external pins; an integrated voltage regulator circuit that is configured to provide an internal supply voltage to the IC chip; isolation circuitry configured to inhibit tampering of the internal supply voltage through the external pins; an integrated voltage regulator interface that is configured to: receive, as part of configuration data for the programmable logic, configuration commands for the integrated voltage regulator circuit; and set, in response to the configuration commands, operational parameters of the integrated voltage regulator circuit; and security circuitry configured to prevent, in response to the programmable logic being programmed, modification of a subset of the operational parameters, the modification identified in configuration commands received subsequent to the configuration data for the programmable logic.

Other features will be recognized from consideration of the Detailed Description and Claims, which follow.

BRIEF DESCRIPTION OF THE DRAWINGS

Various aspects and features of the method, device, and system will become apparent upon review of the following detailed description and upon reference to the drawings in which.

DETAILED DESCRIPTION

Figure 1:
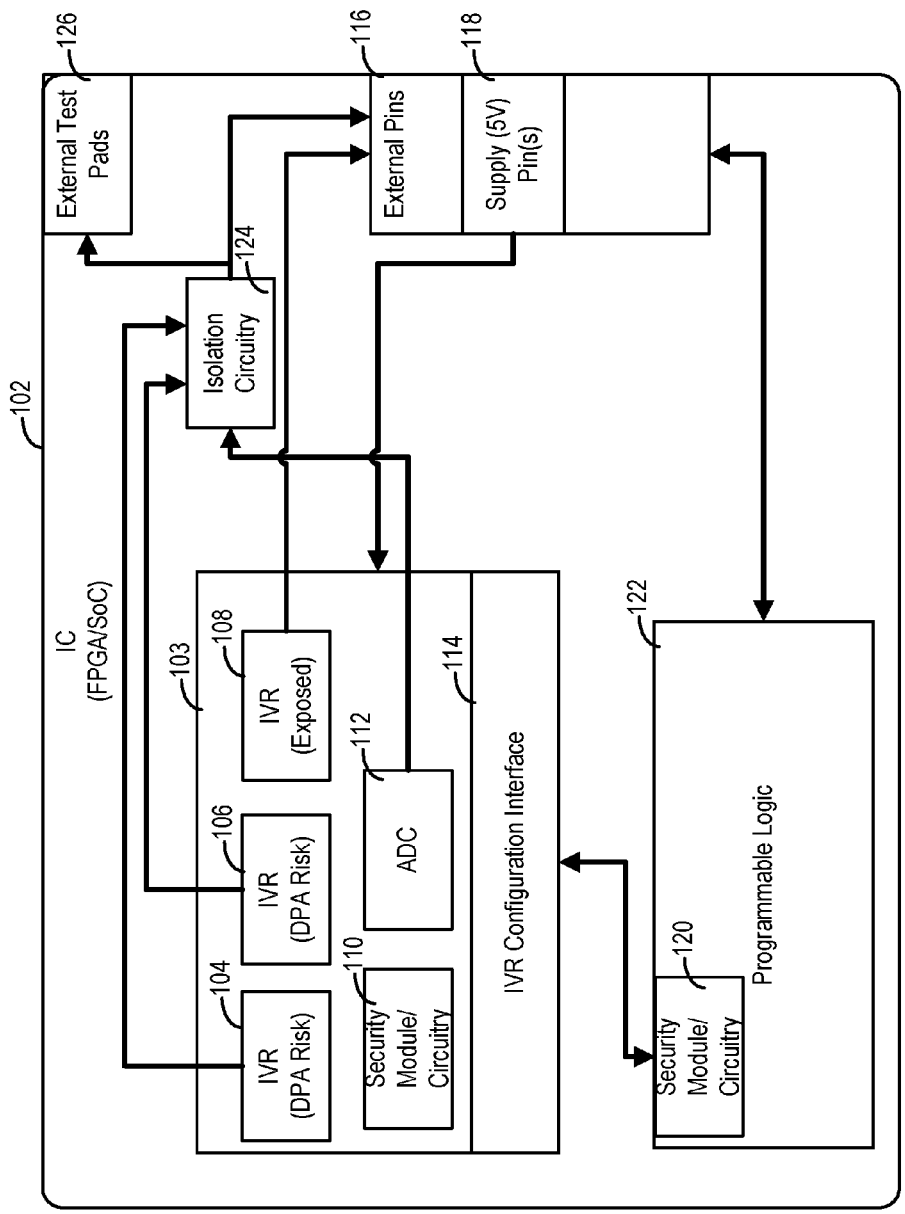
FIG. 1 depicts a block diagram of an IC chip with an integrated voltage regulator circuit, consistent with implementations of the present disclosure.

In the following description, numerous specific details are set forth to describe specific examples presented herein. It should be apparent, however, to one skilled in the art, that one or more other examples and/or variations of these examples may be practiced without all the specific details given below. In other instances, well known features have not been described in detail so as not to obscure the description of the examples herein. For ease of illustration, the same reference numerals may be used in different diagrams to refer to the same elements or additional instances of the same element.

Various implementations are directed toward an IC chip (or simply "IC") that includes an integrated voltage regulator (IVR) circuit, which provides an internal supply voltage to the IC. The IC is configured to increase security within the IC by inhibiting tampering of the IC and the IVR or detecting such tampering. In particular, some types of tampering, such as through a differential power analysis (DPA) attack, are closely related to the voltage regulator circuit(s) of the IC.

More particular implementations are directed toward an IC that includes both programmable logic and an integrated voltage regulator circuit. Additional security can be provided while still allowing flexibility in configuring and monitoring of the voltage regulator circuit for different applications and the corresponding different configurations of the programmable logic.

The use of an IVR circuit can be beneficial in that a system designer does not need to provide the equivalent regulation using components placed externally, relative to the IC chip. The components used to provide the regulation might otherwise have represented a weakness in the security of the system. For instance, the nodes of an external voltage regulator are more easily accessed by an attacker because the external components are not contained within an IC package. In addition to inherent difficulties in accessing nodes internal to an IC chip, the IC chip might also include one or more anti-tamper protections. For external components, the attacker might adjust the capacitive, resistive, or inductive values used by the voltage regulator circuit in order to obtain information about the internal workings of the IC. The attacker might also monitor properties of the voltage regulator circuit, such as the voltage, current, or temperature. Other attack methods are possible, such as overriding or replacing the voltage provided by the voltage regulator circuit with a voltage controlled by the attacker.

For ICs such as FPGAs and SoCs, the number of external connections (pins) that are available for use for input/output can be a limiting factor in the capabilities of the IC. When an internal voltage regulator circuit is used, pins that would otherwise be used for providing supply voltage can be used for other (e.g., input/output) purposes. Various aspects of the present disclosure relate to the ability to provide isolation between the internally-regulated voltage and externally-accessible structures, such as pins and test points. The level, type, and manner of isolation can vary depending upon the particular implementation.

An effect of using IVR circuits is that the corresponding voltage supply pins are no longer easily accessible to external testing equipment. As such, it can become difficult to properly test the IC during the manufacturing process. Various implementations allow for such testing using an internal analog-to-digital converter (ADC) circuit that monitors the voltage produced by the integrated voltage regulator circuit. It is recognized that the level of IVR circuit control and ADC measurement information that is available during the testing might be misused by an attacker in possession of a fully-programmed IC. Implementations of the present disclosure are directed toward limiting the ability of a potential attacker to access the IVR and ADC circuitry after the testing and programming of the IC. Particular implementations allow the legitimate programmer of the IC to specify the level of protection offered by specifying the desired protection as part of the design file or bitstream.

A DPA attack is a particular type of side-channel attack where the parameters of the power system are analyzed to infer operational properties of a secure element (e.g., cryptography logic). The analyzed properties can be statistically analyzed to derive information about secret keys used by the secure element. Various aspects of the present disclosure can be particularly useful for protecting against DPA attacks.

Turning now to the figures, FIG. 1 depicts a block diagram of an IC chip with an integrated voltage regulator circuit, consistent with implementations of the present disclosure. IC 102 is depicted as containing programmable logic 122; however, it is recognized that various aspects can be useful whether or not the IC 102 contains programmable logic. Moreover, additional components that can be part of IC 102 are not necessarily depicted. A few non-limiting examples of possible additional components that are not expressly depicted include microprocessors, memory circuits, analog-to-digital converters (ADCs), and input/output (IO) interfaces. As discussed herein, the IC 102 can be a programmable IC chip with configurable logic blocks, such as an FPGA or SoC.

IC 102 is depicted as including an integrated voltage regulator (IVR) block 103. The IVR block 103 can include one or more IVR circuits 104, 106, and 108. FIG. 1 depicts three IVR circuits, but there can be more or less IVR circuits in a particular IC design. Each of the IVR circuits can be configured to be powered from one or more external supply voltages provided through corresponding connection paths (e.g., conductive traces) to the external supply pin(s) 118. The IVR circuits produce regulated supply voltages for use by components within the IC 102. IVR block 103 is depicted as including a mix of IVR circuits that are both sensitive and not sensitive to DPA (or other security attacks). The DPA sensitive IVR circuits 104 and 106 can be configured to provide power to internal circuits that process sensitive data, which might be compromised if the IVR circuits 104 and 106 are easily accessible to an attacker. For instance, the IVR circuits 104 and 106 might provide power to processing circuits that perform cryptographic functions. Information gleaned from the IVR circuits 104 and 106 could provide side-channel information that weakens the encryption protection. In some instances, the programmable logic 122 can contain secure processing circuits that are potential targets for side-channel attacks. Secure processing circuits could also be located elsewhere, such as in dedicated processor or logic circuits.

FIG. 1 also shows that not all of the IVR circuits will necessarily have the same level of security risks. For instance, IVR circuit 108 might be used to provide power to elements that are not likely to pose security risks if IVR circuit 108 is accessible to an attacker. In a particular example, the IVR circuit 108 could provide power to external input/output pins 116. As the purpose of the IVR circuit 108 would be providing power to externally accessible pins, the IVR circuit 108 would necessarily be somewhat exposed to an attacker. According to various implementations, the IVR circuit 108 can be isolated from the secure IVR circuits 104 and 106 so that useful side-channel information is not obtainable from IVR circuit 108.

Secure IVR circuits 104 and 106 can be protected from DPA or other attacks using several different protection solutions. Unless otherwise stated, it is recognized that the various protection solutions can be used alone or in different combinations. One category of protection solution involves the use of isolation circuitry 124 to make access the regulated voltage of the IVR difficult. For example, isolation circuitry 124 can include a large resistor between a regulated voltage output and external pins 116 or external pads 126. According to certain implementations, the external test pads 126 can include test points that are designed for use in verifying the function of the IVRs on the chip. The verification might then be performed, for example, during manufacturing testing, during development of a product, during troubleshooting of an end product, or combinations thereof.

The use of a large resistor allows for the voltage to be monitored while inhibiting an attacker from using the exposed connection point to override the IVR function. For example, the attacker might try to lower or raise the regulated voltage by providing an external voltage or load to the regulated output of the IVR circuit. If the current draw from the external supply is sufficient, the IVR circuit may not be able to maintain the regulated voltage within the specified tolerance of the regulated voltage. An attacker can use this type of attack to gain information about the workings of the IC 102. The use of a large series resistor can significantly reduce the amount of current that is drawn through this type of attack, making it more difficult to override the IVR circuit.

Consistent with certain implementations, isolation circuitry 124 can include an active current-limiting circuit. The circuit can be configured to detect the amount of current drawn by the external pin or pad and to limit current in excess of an acceptable amount. This might include, as a non-limiting example, the use of a series transistor that is controlled in response to the detected current.

According to certain implementations, the isolation circuitry 124 can include one or more one-time-programmable (OTP) fuses (also sometimes referred to as "electronic-fuses" or "e-fuses"). Once the fuse is blown, access to the regulated voltage is no longer possible through the external test pads 126 or pins 116. For example, a chip manufacturer might use a set of external test pads 126 to verify the IVR functions. Once the chip passes the functional tests, the corresponding e-fuse(s) can be blown so that an attacker is not able to use the same test pads to obtain side-channel information.

In some implementations, the IC 102 is designed to provide isolation for the one or more of the IVR circuits 104, 106 by not having any dedicated external connections to the IVR. The isolation can be accomplished by keeping the regulated output of the IVR isolated from nodes that are externally accessible (e.g., through external pads 126 or external pins 116). Thus, the IC 102 does not include connection points, or connection nodes, that provide the regulated voltages for direct measurement by a manufacturer (e.g., as might be monitored using a test fixture). The inability to directly measure the regulated voltages can create issues with fully testing the IC because the regulated voltages are not directly measurable for the purposes of detecting and diagnosing problems with ICs. For instance, if the regulated voltages were directly observable, monitoring circuitry could be used to precisely measure and quantify the properties of the regulated voltages.

Consistent with various implementations, the IC 102 can include one or more internal analog-to-digital converters (ADCs) 112 that are configured to monitor and report on the regulated voltages and other parameters relating to the IVR circuits. The monitoring can be used at different points, such as part of a test procedure, during development of a product, during normal operation of an end-product, as part of trouble-shooting, and combinations thereof. The different manners in which the IVR circuits are accessible, including those expressly and implicitly discussed herein, can be used in various combinations or individually.

In various implementations, the ADCs 112 can be directly accessed through external pads 126 or external pins 116. The access might include, as an example, accessibility through a Joint Test Action Group (JTAG) compliant port, interface, and protocol, an inter-integrated circuit (I2C) compliant port, or other interface solutions. In certain implementations, the external accessibility can be limited through the use of isolation circuitry 124. For example, OTP fuses can be used. The OTP fuses can be blown before a product is shipped to block access by a potential attacker.

According to certain implementations, the ADCs 112 can be configured for use by the IC 102 apart from the test mode and corresponding monitoring of the regulated voltages. For instance, the IC 102 can be a programmable IC that can be configured by the end users for a variety of different end uses. The ADCs 112 can be used to monitor various input pins that can be routed to an input of the ADCs 112 depending upon the particular design. Moreover, the ADCs 112 can be configured to monitor signals and sensors that are internal to the IC 102. Examples of monitoring can include monitoring temperature sensors within the IC or routing certain internal signals to the ADC inputs, for example. According to various implementations, the ADCs 112 can include one or more multiplexers that are configured to allow for selection between different inputs to the corresponding ADC, and programmable logic 122 can include routing logic that allows different signals to be connected to the inputs of the multiplexers.

In some implementations, the ADCs 112 are accessible through IVR configuration interface 114. Interface 114 can also provide access to the configuration settings for the IVR circuits 104, 106, and 108. The configuration settings can include (but are not limited to) one or more of voltage regulation thresholds, current thresholds, and IVR switching frequency. For example, IVR circuit 104 might be configured to provide a regulated output voltage around 1.8 V by setting upper and lower threshold voltages of 1.9 V and 1.7 V, respectively. More complex configuration settings are also possible, such as setting hysteresis values for each of the upper and lower threshold voltages.

IC 102 can be configured to provide protection from misuse of the interface 114 by a potential attacker. For instance, one or both of security modules/circuitry 110, 120 can be configured to control and monitor accesses made using the IVR configuration interface 114. FIG. 1 shows a first security circuitry 110 that is located within the IVR block 103 and a second security circuitry 120 that is located within the programmable logic 122. For example, the manufacture of the IC can provide customers with one or more preconfigured logic functions that can be used to create security module 120 within the programmable logic 122. Security circuitry 110 can be hardwired into the IVR block 103.

Consistent with various implementations, one or both of the security circuitry 110, 120 can be implemented consistent with the different security-related functions described herein. When used in combination, the different functions can be shared between the security circuitry 110 and 120. For instance, the security circuitry 110 can be configured to handle encryption and authentication (as discussed in more detail herein), either by having an internal cryptographic functionality or through a secure interface with a cryptographic processor. Security circuitry 120 might control which configuration commands are allowed to reach the IVR circuits 104, 106, and 108.

One type of security function can include verifying a design file (e.g., received as a bitstream) that is used to configure the programmable logic 122 of the IC 102. As a non-limiting example, the IC 102 can be configured to load, upon power-up, a design file as a bitstream stored in a non-volatile memory. The bitstream can include, as part of configuration data for the programmable logic, configuration commands for setting various parameters of the IVR circuits. The bit stream can also program modules within the programmable logic that are designed to generate subsequent configuration commands for the IVR circuits. For instance, a design might call for different power modes to be supported by the IVR circuits. Each power mode might use a different regulated voltage. The programmable logic can include modules that generate different IVR configuration commands to support the transitions between the power modes.

Accordingly, the configuration commands can specify a variety of different desired operational parameters of the IVR circuits (e.g., voltage and current thresholds). In some implementations, security circuitry 110, 120 verifies that the bitstream, including the configuration commands, is valid before allowing the operational parameters to be set for IVR circuits. The verification can involve encryption and authentication of the bitstream and configuration commands. For example, the bitstream can be received in an encrypted form (e.g., using advanced encryption standard (AES)). The security circuitry 110, 120 can use a secure key to decrypt the bit stream. The key can be stored internally in either dedicated RAM, backed up by a small externally connected battery, or in one-time-programmable (OTP) fuses. Programming of the encryption key into the device can be limited to prevent subsequent tampering (e.g., by only allowing programing via a particular port and then disabling the port after initial use).

Consistent with various implementations, the security circuitry 110, 120 uses an authentication process to verify the bitstream before IVR configuration commands are accepted. For instance, hashed message authentication code (HMAC) algorithm can be used. The security circuitry 110, 120 verifies a message authentication code (MAC) before allowing configuration commands to reach or modify the IVR circuits. The authentication can be used in connection with or separate from the encryption. As another example, an authenticated encryption method, such as AES-GCM (Advanced Encryption Standard Galois Counter Mode) can be used to provide both encryption and authentication.

The security circuitry 110, 120 can also be set to verify commands received from programmable logic 122 during normal operation (e.g., subsequent to the initial programming of the IC 102). For example, one or more of encryption and authentication can be required before a command is processed and used to set operational parameters of the IVR circuits.

According to some implementations, the security circuitry 110, 120 allows a first set of configuration commands to be used during initialization and then reduces the set of allowed configuration commands to be used for subsequent operation. In an extreme example, the security circuitry 110, 120 can prevent any configuration commands from changing the configuration of the IVR circuits. For other situations, the security circuitry 110, 120 could be configured to allow only a limited subset of changes. The security circuitry 110, 120 subsequently compares received commands against the defined subset and the associated operational parameters. The specific subset can be defined as part of the encrypted and validated bitstream. For example, the security circuitry 110, 120 could limit the acceptable configuration commands so that an IVR circuit can only be changed in a manner that corresponds to two (or more) pre-determined modes of operation (e.g., as might correspond to different modes of power consumption for the IC).

In some implementations, the security circuitry 110, 120 can use the ADCs 112 to monitor the IVR circuits to detect tampering. The bitstream can define desired operational parameters for the various IVR circuits. The security circuitry 110, 120 can use the operational parameters to identify IVR circuits that deviate or vary from these parameters in ways that correspond to potential tampering. In response to detection of variations consistent with tampering, the security circuitry 110, 120 can take appropriate action, depending upon the specific configuration. For instance, the security circuitry 110, 120 could shut down the IC 102 to prevent any further use. The security circuitry 110, 120 might generate an error signal that is received by the programmable logic 122, or by an external circuit through external pins 116. The security circuitry 110, 120 could disable certain secure functions (e.g., cryptographic functions), while allowing the IC to continue to carry out other functions. Various combinations of these and other responses are possible.

According to certain implementations, the security circuitry 110, 120 compares input from the ADC 112 to one or more tamper profiles. The tamper profiles can include a set of thresholds and associated profiles for one or more measurable values, such as voltage, current, or temperature. The use of specific profiles can reduce the number of false positives. For example, the security circuitry 110, 120 can compare measured values to a tamper profile that specifies different levels of current draw that are acceptable, where the different levels correspond to the state or modes of the IC 102 and corresponding circuitry. For instance, when a processing-intensive (cryptographic) function is active, the corresponding IVR circuit can be placed in a high power mode by raising the regulated voltage output. The tamper profile can specify a higher acceptable current draw and temperature, relative to when the cryptographic function is inactive. Other parameters can also be specified as part of the tamper profiles. For example, the duration of measured event(s) can be indicative of the source of the event. The measured event might correspond to a duration of increased current draw. As another example, the relationship between two or more parameters (e.g., temperature is expected to increase with detected increases in power use) can be part of the tamper profile. Further, the security circuitry 110, 120 may be set with more stringent parameters or to check more frequently when cryptographic functions or other critical functions are active.

Consistent with various implementations, the ADCs 112 can provide a sample-and-hold function that is used to measure and detect voltage characteristics, such as minimum and maximum (peak) values, for the regulated voltages. For example, a sample-and-hold circuit can be used along with a comparison circuit so that the ADC can hold its current analog value unless the presently measured value is higher (for peak detection) or lower (for minimum detection) than the analog held value. The use of a sample-and-hold circuit can be particularly useful for providing accurate measurement of fast transients on the regulated voltage. For instance, the ADC produces a single digital output value over a measurement window during which multiple measurements can be taken in the analog domain.

For a peak or minimum voltage detection, each newly-generated analog held value can be compared to the analog held value from a prior sample-and-hold window. The comparison can be used to determine whether to replace the prior analog held value with the newly-generated analog held value, or to leave the prior analog held value. For example, a peak detection can operate by replacing the prior analog held value upon determining that the newly-generated analog held value is greater than the prior analog held value. The comparator circuit for this function can be designed to operate in the analog domain at high speed, allowing for the ADC to have a relatively high effective resolution over the measurement window (e.g., by decoupling each individual analog measurement from the digitization of the measured analog value). Once the measurement window has ended, the analog held value on the ADC represents the voltage characteristic for the measurement window. The analog value can then be converted to a digital value and stored in a memory circuit. In particular applications, such a circuit can provide a resolution of about 1 nanosecond or less for transients occurring during each of the sample-and-hold windows, which can catch correspondingly short transients on the regulated voltage.

According to various implementations, the ADCs 112 can include an averaging circuit that is configured to provide an averaging function that operates in the analog domain. The averaging circuit can be configured to operate in the analog domain at high speed, allowing for the ADC to have a relatively high effective resolution over the measurement window. Once the measurement window has ended, the average value on the ADC can then be converted to a digital value and stored in a memory circuit.

According to certain implementations, a programmer of the IC can specify whether or not an IVR circuit is considered secure. For example, the bitstream can indicate which of the IVR circuits supply power to secure components. The security circuitry 110, 120 can use the information to provide tamper prevention consistent with the various implementations discussed herein. The secure nature of the IVR circuit can also be based upon a hardwired configuration of the IC 102. For example, the IC 102 can contain a dedicated cryptographic circuit that is hardwired (and not programmable). The IVR circuit powering the dedicated cryptographic circuit is subject to tamper protection regardless of the configuration of the programmable logic.

Consistent with various implementations, the IVR block 103 operates in a set and predetermined manner while the IC 102 is in a power-up or initialization mode. The security circuitry 110, 120 can prevent configuration of the IVR circuits 104, 106, and 108 while in the initialization mode, and until such as time as the bitstream has been decrypted and authenticated. The security circuitry 110, 120 can also be configured to monitor the IVR circuits 104, 106, and 108 relative to the predetermined settings for the IVR circuit 104, 106, and 108. The security circuitry 110, 120 can compare the measured values against the predetermined settings in order to detect potential tampering that occurs before the bitstream is loaded.

Various implementations are directed toward the intentional modification of operational parameters the IVR circuit as part of a tamper detection process. For example, the security circuitry 110, 120 can issue a configuration command to temporarily increase or decrease the regulated output voltage thresholds for the IVR circuits. The security circuitry 110, 120 monitors the regulated output voltage to verify that the expected voltage (and other parameters such as current and temperature) match the measured voltage. This can be particularly useful for detecting an attack that uses an external voltage to override (or otherwise directly modify) the regulated voltage. Further, the security circuitry 110, 120 can implement the tamper detection process without knowledge or prompting from an external source (such as prompting from modules implemented within programmable logic). The specific timing can be kept secret and can include a random component so that an attacker is unable to predict when the tamper detection process will occur.

Figure 2:
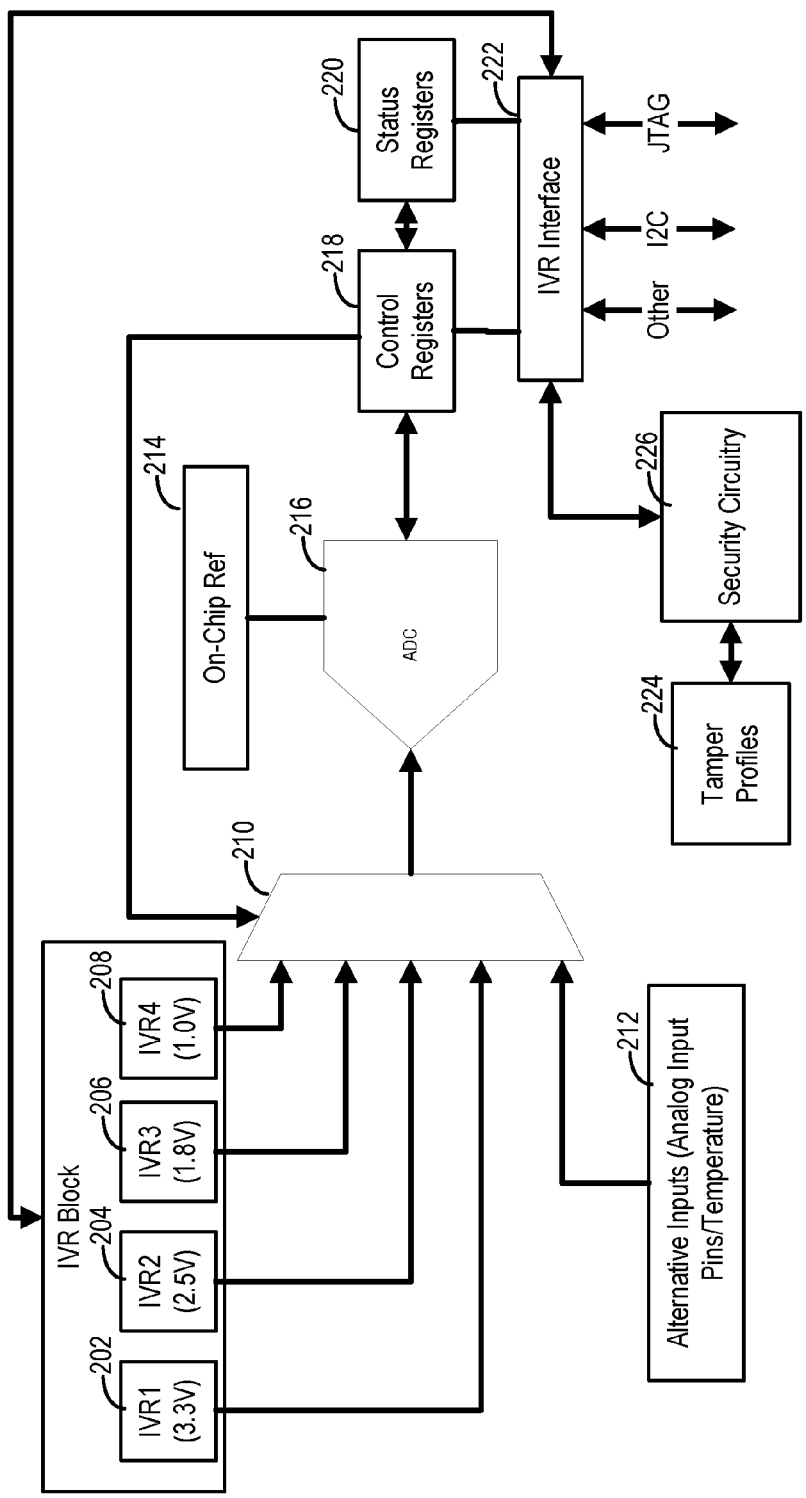
FIG. 2 depicts a block diagram that includes an ADC for measuring parameters associated with voltage regulator circuits, consistent with various implementations of the present disclosure.

FIG. 2 depicts a block diagram that includes an ADC for measuring parameters associated with IVR circuits, consistent with various implementations of the present disclosure. ADC 216 can be configured to provide a digital representation of measured analog inputs that are provided by a multiplexer circuit 210. Multiplexer circuit 210 can be configured to select between various different signal sources including external input/output pins for use in receiving signals from external sources during normal operation of the IC. In certain implementations, the selection can be controlled by a set of control registers 218, which can be accessed through IVR interface 222. In response, the multiplexer can select regulated voltages that are generated by one of the IVRs 202, 204, 206, or 208. The IVRs can be configured to provide a variety of different voltages (e.g., 3.3V, 2.5V, 1.8V, and 1.0V), and can each have different acceptable operational parameters (e.g., acceptable min/max/average voltages). The control registers 218 can be used to configure ADC 216 to measure particular aspects of the regulated voltages. The measured values can be stored in a memory circuit, such as in status registers 220. The measured aspects can include voltage characteristics discussed herein, which can include the peak, minimum, and average voltages and currents. An on-chip reference voltage generator circuit 214 can be used by the ADC 216 to provide an accurate reference point. For instance, a bandgap reference generator circuit could be used to provide a stable and accurate reference voltage.

Consistent with various implementations, the ADC 216 can be configured to operate in different modes in order to capture corresponding aspects of the regulated voltages. Moreover, the different modes can be maintained for a desired time window. In some implementations, the time window can be predetermined, while other implementations allow for the time window to be set by the configuration bitstream. For example, security circuitry 226 can write a value to the configuration registers that places the ADC into a tamper detection mode, selects one of the IVRs, selects an aspect to measure (e.g., peak voltage), and indicates a desired time window during which the measurement is taken. Once the time window is completed and the security circuitry has retrieved the corresponding data, the security circuitry can update the configuration registers to select a different voltage or current characteristic (or other aspect) to measure (e.g., temperature), or select a different regulated voltage supply to measure. According to some implementations, security circuitry 226 can compare the measured values to one or more tamper profiles 224.

In some implementations, the configuration registers can also be used to select between various alternative inputs 212 when not operating in the tamper detection mode. This allows the ADC to be used for a number of different purposes by the programmer (end user) of the IC.

Figure 3A:
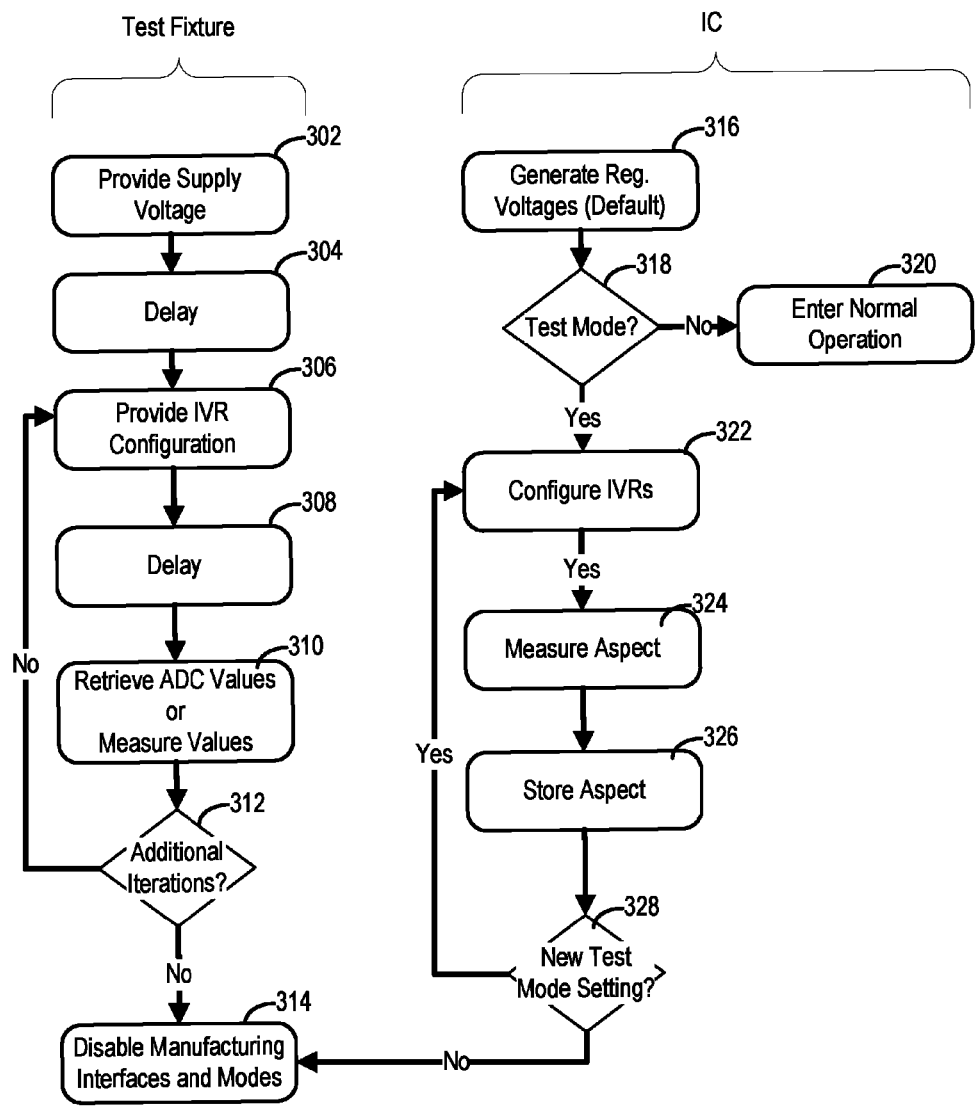
FIG. 3A is a flow diagram for use in connection with a manufacturing test procedure, consistent with various implementations of the present disclosure.

FIG. 3A is a flow diagram for use in connection with a manufacturing test procedure, consistent with various implementations of the present disclosure. Blocks 302-314 represent functions that can be carried out by the test fixture, while blocks 316-328 represent functions that can be carried out by an IC that can be placed into the test fixture. Once an IC is placed in the test fixture, the test fixture can provide an external supply voltage (e.g., 5V), per block 302. In a non-limiting example, the IC chip can be placed in a clamshell or similar structure that creates electrical connections between the test fixture and the pins and test pads of the IC chip. The power can be provided through the corresponding electrical connections.

In response to receiving the external supply voltage, the IC can begin generating the internal regulated voltages, per block 316. Consistent with the discussion herein, the IVR circuits can be configured to operate in a predetermined (and limited) manner while the IC 102 is in a power-up or initialization mode. The IC chip can then determine whether or not a test mode should be entered, per block 318. The determination can be made based upon one or more input provided by the test fixture, the configuration of OTP fuses, or other solutions that allow the IC chip to distinguish normal operation (per block 320) from a manufacturing/test fixture mode.

Consistent with various implementations, the test fixture can be configured to delay for a period of time that is sufficient for the IC to produce stable regulated internal voltages, as shown by block 304. The delay can be a set time that is consistent with the expected (or maximum accepted) time for the IVRs to reach steady state conditions. In some instances, the delay can be based upon the IC providing an indication that the regulated internal voltages are stable (e.g., by setting a flag/bit in status registers or toggling an input/output pin).

As part of the manufacturing test procedure, the test fixture can provide IVR circuit configuration commands, per block 306. For instance, the test fixture can use a JTAG interface to write to one or more configuration registers of the IVR block. In response, the IC chip configures the IVR circuits per block 322. The test fixture can then delay to allow the newly configured IVR circuits to stabilize, per block 308. In implementations where the IVR circuits are not accessible through external pins or test pads, the IC chip can use an ADC to measure one or more aspects of the IVR circuits, per block 324. For example, the ADC might be configured to measure voltage characteristics for a particular regulated voltage, such as the voltage peak. Once the measurement(s) are complete, the IC chip can determine and store the digital value for the monitored aspect(s), per block 326 (e.g., by digitizing an analog value detected by the ADC). The test fixture can then retrieve the stored values, per block 310.

The test fixture and IC chip can repeat the configuration and measurement process through multiple iterations, per blocks 312 and 328 respectively. For instance, the test procedure might vary the regulated output voltages between the minimum and maximum values specified for the IC chip and with a representative set of values between the minimum and maximum values. Once process completes, the manufacturing interfaces and modes can be disabled to prevent an attacker from simulating a manufacturing test procedure, per block 314.

According to some implementations, the IC chip can require that the test fixture use encryption, authentication, or both encryption and authentication, when providing the configuration commands, per block 306. The use of encryption and authentication can be useful for preventing an attack that attempts to replicate the test fixture in order to gain information about the workings of the IC chip. As a non-limiting example, the IC chip can be hardcoded with a secret key that is maintained by the manufacturer and not otherwise available to users of the IC chip.

Figure 3B:
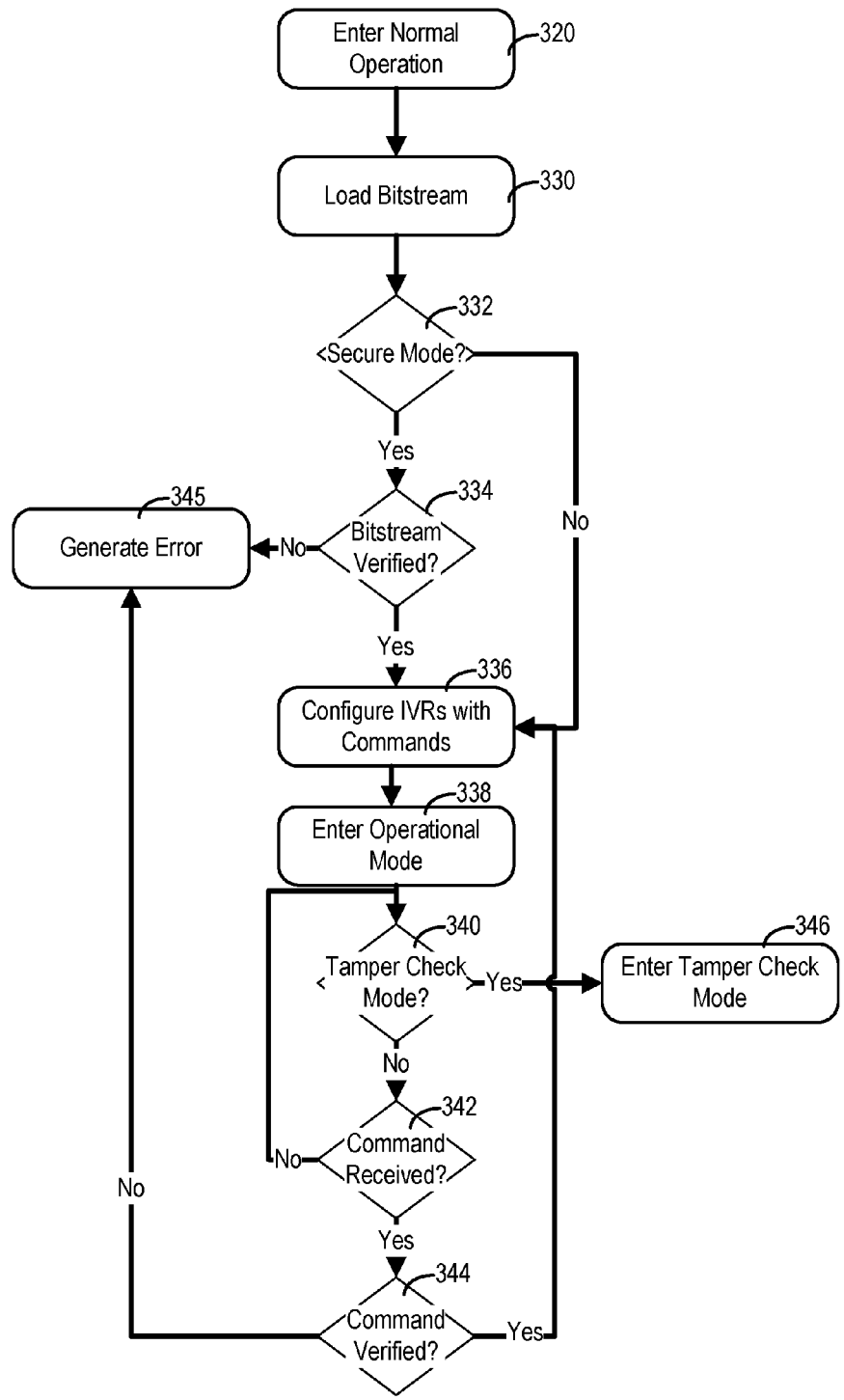
FIG. 3B is a flow diagram for normal operation of an IC chip, consistent with various implementations of the present disclosure.

FIG. 3B is a flow diagram for normal operation of an IC chip, consistent with various implementations of the present disclosure. Upon entering normal operation, per block 320, the IC chip can load a bitstream, per block 330. The source of the bitstream can vary according to the IC chip design, the system configuration, or other factors. For example, the IC chip may allow for a bitstream to be loaded from a computer via an external interface when the IC chip is being used by a developer, who may wish to often change the bitstream during the design phase of a product. An IC chip that is being used in an end product being provided to a customer, however, might not permit the design to be changed in a similar manner (e.g., only allowing a bitstream to be loaded from on-chip non-volatile memory).

Consistent with the possibility of using the same type of IC chip in different manners that may or may not benefit from certain security features, the IC chip can determine whether or not to enter a secure mode, per block 332. As but one example, an OTP fuse or a one-time writable memory register could be used to set the IC chip in the secure mode. As part of the secure mode, security circuitry of the IC chip verifies the bitstream per block 334. The verification can include one or both of decryption and authentication. If the bitstream is not verified, the security circuit can generate an error signal or message, per block 345. The error message can be stored and used in a variety of different manners. In some instances, the error signal/message can be passed to other component(s) in the system through external connections of the IC chip. The error message can also be stored in a non-volatile memory within the IC chip. The non-volatile memory might then be accessed by other components in a system or by a technician. The error message might then help identify and determine the source of the problem.

Once the bitstream is verified, the IC chip can set the operational parameters of the IVR circuits according to configuration commands specified by the bitstream, per block 336. For example, each IVR circuit can be configured according to a desired supply voltage level by setting corresponding threshold levels for the feedback control loops of the IVR circuits. The security chips can enter operational mode, per block 338. As a particular, non-limiting example, the operational mode can correspond to the release of a power-up reset signal. The release can be triggered after allowing the IVR circuits enough time to reach stable output voltages.

Consistent with various implementations, the security circuitry can implement one or more tamper check modes, per block 340. The security circuitry can be configured to enter tamper check modes from any of a variety of different triggers events, per block 346. For instance, the tamper check modes might be responsive to a series of periodic trigger events that occur at regular intervals. In some instances, the specific timing of the intervals can be varied so that it is difficult for an attacker to predict when the trigger events will occur. For instance, the security circuitry can be configured to use a base interval of 500 milliseconds for triggering tamper check modes. The security circuitry could then vary the timing for each trigger event by different (random or pseudorandom) amounts (e.g., an amount randomly selected between −250 and 250 milliseconds). The trigger events could also be driven by various other types of trigger events. For instance, the trigger events could be responsive to communications received in the same manner that the IVR configuration commands are received, including the possible use of encryption and authentication. Various combinations of different trigger events are also possible.

The security circuitry can also monitor for the receipt of additional configuration commands, per block 342. The security circuitry can use encryption, authentication, or both, to verify the commands, per block 344. The verification can also be relative to a reduced set of allowed commands (relative to a larger set of configuration commands available during initial power up). For example, an attacker might attempt to issue one or more of the prohibited commands. If the command fails verification, the security circuitry can deny the command and an error message can be generated, per block 345. Otherwise, the configuration command can be used to change the configuration of the IVR circuits (e.g., by changing the output voltage for different power modes). Consistent with the discussions herein, the configuration commands can also include configuration and access requests relative to the ADC and measurements of the IVR circuits.

Figure 3C:
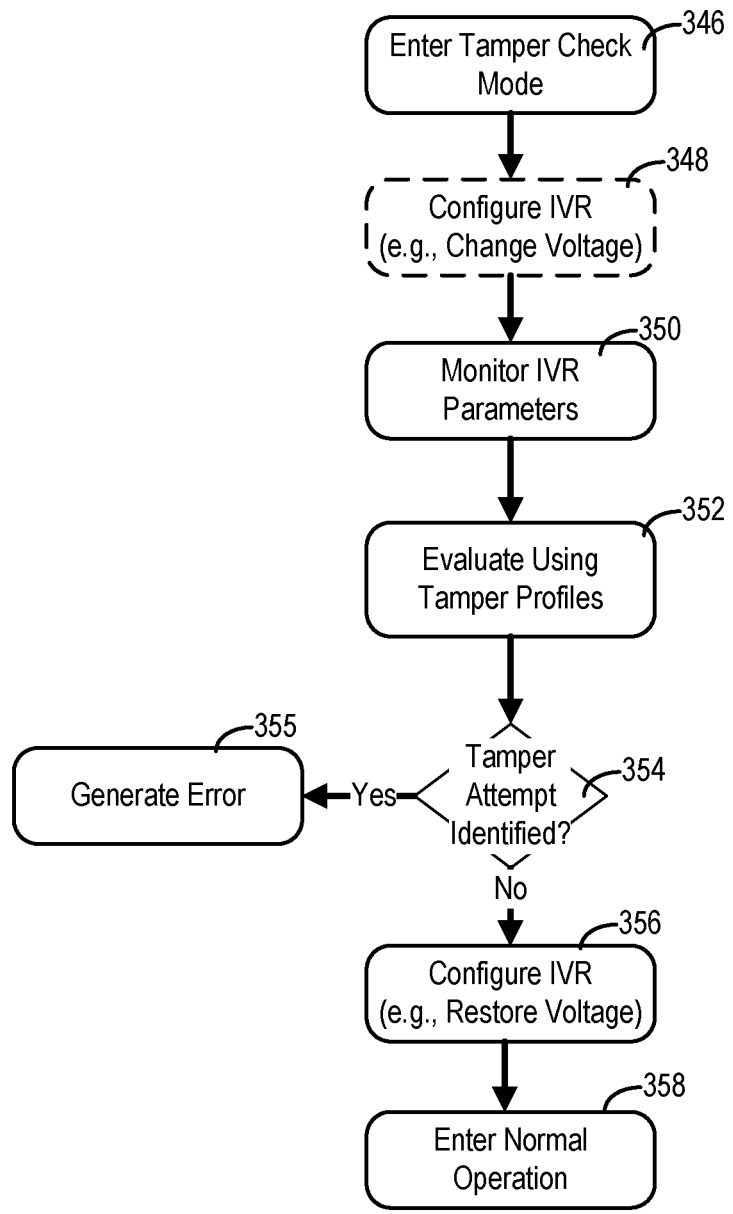
FIG. 3C is a flow diagram for tamper check mode operation of an IC chip, consistent with various implementations of the present disclosure.

FIG. 3C is a flow diagram for tamper check mode operation of an IC chip, consistent with various implementations of the present disclosure. After entering tamper check mode, per block 346, the security circuitry can (optionally) configure the IVR circuits as part of the check. For example, the security circuitry can raise or lower the regulated voltage as part of a verification that an external voltage source (from an attacker) is not driving, or otherwise altering, the voltage supply node. Whether or not the IVR circuits are reconfigured in block 348, the IVR parameters can be monitored using the ADC circuit, per block 350. It is possible to configure the ADC circuit to continual monitor the IVR parameters (as opposed to only monitoring during the tamper check mode. It is recognized, however, that continual or frequent monitoring may consume more power and render the ADC circuit less available for other uses.

The security circuitry next evaluates the monitored results according to one or more tamper profiles, per block 352. The tamper profiles can be implemented according to various different levels of complexity. For example, a first tamper profile might specify a minimum and maximum voltage range that is acceptable. Another tamper profile might specify an expected rate of change for the regulated output once the IVR circuit is reconfigured, or an expected time for the regulated output to stabilize at the desired voltage. A measured rate that is significantly faster or slower that the expected rate may indicate there is a voltage or load being applied externally by an attacker. Other tamper profiles may link multiple measurements together. For instance, the tamper profile can specify an expected temperature change resulting from a corresponding change in voltage or current. Deviations from the expected change can be used to detect an attack based upon controlling the temperature of the IC chip.

In response to detecting possible tampering, per block 354, the security circuitry can generate an error message per block 355. The security circuitry can also perform other actions, such as disabling all or part of the IC chip. For example, in response to detecting a problem with a particular IVR circuit, the security circuitry can disable secure functions that use power from the particular IVR circuit.

If no tampering is detected, the security circuitry can reconfigured the IVR circuits for normal operation, per block 356. In particular, the security circuitry can return the IVR circuits to the state the circuit was were upon entering the tamper detection mode. In certain implementations, the security circuitry can queue configuration commands received during the tamper check mode (e.g., commands requesting reconfiguration of one or more IVR circuits due to a change in the IC chip's power mode). The queued commands can be verified and carried out upon returning to normal operation mode, per block 358.

Figure 4:
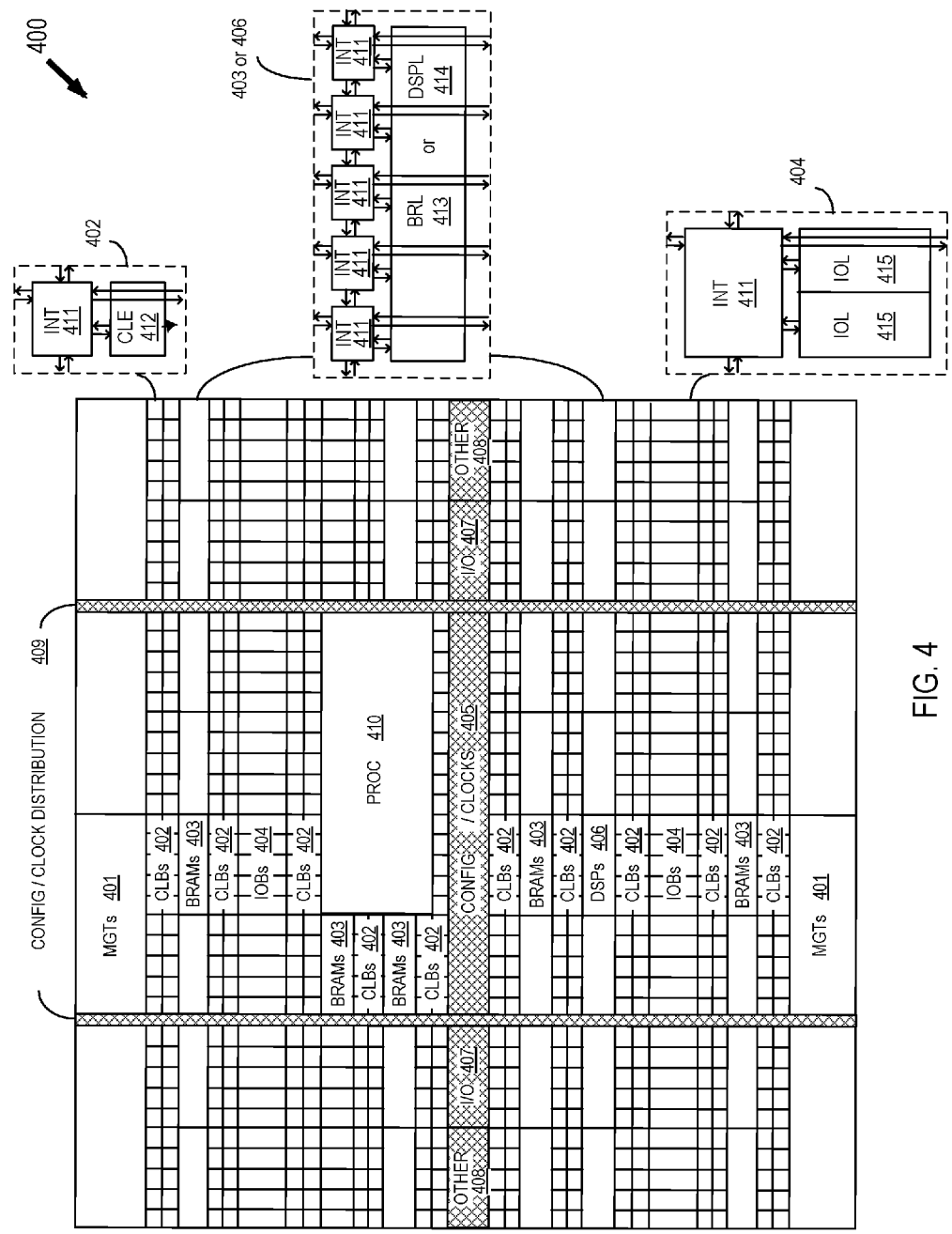
FIG. 4 shows a programmable integrated circuit (IC) 400 on which the disclosed circuits and processes may be implemented.

FIG. 4 shows a programmable integrated circuit (IC) 400 on which the disclosed circuits and processes may be implemented. The programmable IC may also be referred to as a System on Chip (SOC) that includes field programmable gate array logic (FPGA) along with other programmable resources. FPGA logic may include several different types of programmable logic blocks in the array. For example, FIG. 4 illustrates programmable IC 400 that includes a large number of different programmable tiles including multi-gigabit transceivers (MGTs) 401, configurable logic blocks (CLBs) 402, random access memory blocks (BRAMs) 403, input/output blocks (IOBs) 404, configuration and clocking logic (CONFIG/CLOCKS) 405, digital signal processing blocks (DSPs) 406, specialized input/output blocks (I/O) 407, for example, clock ports, and other programmable logic 408 such as digital clock managers, analog-to-digital converters, system monitoring logic, and so forth. Some programmable IC having FPGA logic also include dedicated processor blocks (PROC) 410 and internal and external reconfiguration ports (not shown).

In some FPGA logic, each programmable tile includes a programmable interconnect element (INT) 411 having standardized connections to and from a corresponding interconnect element in each adjacent tile. Therefore, the programmable interconnect elements taken together implement the programmable interconnect structure for the illustrated FPGA logic. The programmable interconnect element INT 411 also includes the connections to and from the programmable logic element within the same tile, as shown by the examples included at the top of FIG. 4.

For example, a CLB 402 can include a configurable logic element CLE 412 that can be programmed to implement user logic, plus a single programmable interconnect element INT 411. A BRAM 403 can include a BRAM logic element (BRL) 413 in addition to one or more programmable interconnect elements. Typically, the number of interconnect elements included in a tile depends on the height of the tile. In the pictured implementation, a BRAM tile has the same height as five CLBs, but other numbers (e.g., four) can also be used. A DSP tile 406 can include a DSP logic element (DSPL) 414 in addition to an appropriate number of programmable interconnect elements. An IOB 404 can include, for example, two instances of an input/output logic element (IOL) 415 in addition to one instance of the programmable interconnect element INT 411. As will be clear to those of skill in the art, the actual I/O bond pads connected, for example, to the I/O logic element 415, are manufactured using metal layered above the various illustrated logic blocks, and typically are not confined to the area of the input/output logic element 415.

In the pictured implementation, a columnar area near the center of the die (shown shaded in FIG. 4) is used for configuration, clock, and other control logic. Horizontal areas 409 extending from this column are used to distribute the clocks and configuration signals across the breadth of the programmable IC. Note that the references to "columnar" and "horizontal" areas are relative to viewing the drawing in a portrait orientation.

Some programmable ICs utilizing the architecture illustrated in FIG. 4 include additional logic blocks that disrupt the regular columnar structure making up a large part of the programmable IC. The additional logic blocks can be programmable blocks and/or dedicated logic. For example, the processor block PROC 410 shown in FIG. 4 spans several columns of CLBs and BRAMs.

Note that FIG. 4 is intended to illustrate only an exemplary programmable IC architecture. The numbers of logic blocks in a column, the relative widths of the columns, the number and order of columns, the types of logic blocks included in the columns, the relative sizes of the logic blocks, and the interconnect/logic implementations included at the top of FIG. 4 are purely exemplary. For example, in an actual programmable IC, more than one adjacent column of CLBs is typically included wherever the CLBs appear, to facilitate the efficient implementation of user logic.

For the various flow diagrams depicted herein, the particular orders of the blocks and associated functions are provided as examples. The ordering is not necessarily limiting and can be varied according to various implementations.

Those skilled in the art will appreciate that various alternative computing arrangements, including one or more processors and a memory arrangement configured with program code, would be suitable for hosting the processes and data structures that may carry out functions disclosed herein. In addition, the processes may be provided via a variety of computer-readable storage media or delivery channels such as magnetic or optical disks or tapes, electronic storage devices, or as application services over a network.

Though aspects and features may in some cases be described in individual figures, it will be appreciated that features from one figure can be combined with features of another figure even though the combination is not explicitly shown or explicitly described as a combination.

The methods and system are thought to be applicable to a variety of systems that use RAM circuits. Other aspects and features will be apparent to those skilled in the art from consideration of the specification. The portions of the methods and system may be implemented as one or more processors configured to execute software, as an application specific integrated circuit (ASIC), or as a logic on a programmable logic device. Moreover, the various circuits identified herein may share hardware circuitry, such as use of a common computer processing unit or digital processing unit. It is intended that the specification and drawings be considered as examples only, with a true scope of the invention being indicated by the following claims.

What is claimed is:

1. A method for use with an integrated circuit (IC) chip, the method comprising:
   receiving, as part of configuration data for programmable logic of the IC chip, configuration commands for an integrated voltage regulator circuit;
   setting, in response to the configuration commands, operational parameters of the integrated voltage regulator circuit;
   generating, using the integrated voltage regulator circuit within the IC chip, an internal supply voltage;
   monitoring, using an analog to digital converter (ADC) circuit of the IC chip, parameters of the internal supply voltage;
   detecting, using security circuitry of the IC chip and the monitored parameters, an indication of tampering; and
   generating an error signal in response to detecting the indication of tampering;
   preventing, in response to the programmable logic being programmed, modification of a subset of the operational parameters, the modification identified in configuration commands received subsequent to the configuration data for the programmable logic.

2. The method of claim 1, further comprising isolating the internal supply voltage from external pins of the IC chip by blowing an electronic fuse.

3. The method of claim 1, further comprising, as part of a tamper detection mode, modifying the internal supply voltage generated by integrated voltage regulator circuit and monitoring for corresponding changes in at least one of the parameters of the internal supply voltage.

4. The method of claim 3, wherein the modifying the internal supply voltage includes increasing the internal supply voltage.

5. The method of claim 3, wherein the modifying the internal supply voltage includes decreasing the internal supply voltage.

6. The method of claim 5, wherein the at least one of the parameters includes a voltage level of the internal supply voltage, and wherein the corresponding changes include an expected rate for a reduction in the voltage level of the internal supply voltage.

7. The method of claim 5, wherein the at least one of the parameters includes a temperature of the integrated voltage regulator circuit, and wherein the corresponding changes include an expected reduction in the temperature of the integrated voltage regulator circuit.

8. A system comprising:
   an integrated circuit (IC) chip that includes:
      programmable logic;
      connections to plurality of external pins;
      an integrated voltage regulator circuit that is configured to provide an internal supply voltage to the IC chip;
      isolation circuitry configured to inhibit tampering of the internal supply voltage through the external pins;
      an integrated voltage regulator interface that is configured to:
         receive, as part of configuration data for the programmable logic, configuration commands for the integrated voltage regulator circuit; and
         set, in response to the configuration commands, operational parameters of the integrated voltage regulator circuit; and
      security circuitry configured to prevent, in response to the programmable logic being programmed, modification of a subset of the operational parameters, the modification identified in configuration commands received subsequent to the configuration data for the programmable logic.

9. The system of claim 8, wherein the security circuitry is further configured to verify authenticity of the configuration data for the programmable logic, and to condition setting of the operational parameters upon the verification of the authenticity.

10. The system of claim 9, wherein the integrated voltage regulator circuit is configured to operate according to a predefined set of operational parameters during initialization and before receipt of the configuration data for the programmable logic.

11. The system of claim 9, wherein the security circuitry is further configured to respond to a trigger event by entering a tamper detection mode.

12. The system of claim 8, wherein the isolation circuitry includes at least one of the group consisting of: an electronic-fuse, a resistor configured to prevent excess loading from external pins, and electrical isolation of the internal supply voltage from the external pins.

13. The system of claim 8, wherein the security circuitry is configured to detect variations in parameters of the internal supply voltage that correspond to current loading applied through the external pins.

14. The system of claim 8, wherein the security circuitry is configured to detect variations in parameters of the internal supply voltage that correspond to a voltage being provided to the internal supply voltage from an external source.

15. The system of claim 8, wherein the security circuitry is configured to modify a voltage level generated by the integrated voltage regulator circuit and to detect the presence of an externally-applied voltage by monitoring the internal supply voltage.

16. The system of claim 15, wherein the security circuitry is configured to modify the voltage level by increasing the voltage level.

17. The system of claim 15, wherein the security circuitry is configured to modify the voltage level by decreasing the voltage level.

18. The system of claim 8, wherein the security circuitry is configured to detect variations in current provided by the integrated voltage regulator circuit.

19. The system of claim 8, wherein the security circuitry is configured to use monitored temperature of the integrated voltage regulator circuit to match a tamper profile specifying expected temperatures of the integrated voltage regulator circuit.

* * * * *